US011428285B2

(12) United States Patent
Woloszyn et al.

(10) Patent No.: US 11,428,285 B2
(45) Date of Patent: Aug. 30, 2022

(54) PARKING BRAKE ACTUATION ASSEMBLY

(71) Applicant: FRENI BREMBO S.p.A., Curno (IT)

(72) Inventors: Tomasz Woloszyn, Curno (IT); Alessandro Galassi, Curno (IT); Nicolò Mazzarini, Curno (IT); Italo Pirovano, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 16/343,472

(22) PCT Filed: Oct. 17, 2017

(86) PCT No.: PCT/IB2017/056432
§ 371 (c)(1),
(2) Date: Apr. 19, 2019

(87) PCT Pub. No.: WO2018/073736
PCT Pub. Date: Apr. 26, 2018

(65) Prior Publication Data
US 2019/0264762 A1    Aug. 29, 2019

(30) Foreign Application Priority Data

Oct. 20, 2016  (IT) ................. 102016000105859

(51) Int. Cl.
*F16D 65/22*  (2006.01)
*F16D 51/22*  (2006.01)
(Continued)

(52) U.S. Cl.
CPC ............ *F16D 65/22* (2013.01); *F16D 51/22* (2013.01); *F16D 65/52* (2013.01); *F16D 65/565* (2013.01);
(Continued)

(58) Field of Classification Search
CPC .......... F16D 65/22; F16D 51/22; F16D 51/18; F16D 2125/60; F16D 2121/14;
(Continued)

(56) References Cited

U.S. PATENT DOCUMENTS 4,886,134 A * 12/1989 Yamamoto ................ F16C 1/12
188/2 D
4,930,605 A *  6/1990 Boyer ................... B60T 11/046
188/106 A
(Continued)

FOREIGN PATENT DOCUMENTS

DE     102014204769 A1    6/2015
EP        1098102 A2     5/2001
(Continued)

OTHER PUBLICATIONS

European Patent Office, International Search Report, issued in PCT/IB2017/056432, dated Jan. 22, 2018, 11 pages, Rijswijk, Netherlands.

*Primary Examiner* — Robert A. Siconolfi
*Assistant Examiner* — Mahbubur Rashid
(74) *Attorney, Agent, or Firm* — Marshall & Melhorn, LLC

(57) ABSTRACT

A brake actuation assembly comprising a thrust and support element comprising a first thrust end adapted to cooperate with a first jaw of a brake; the thrust and support element comprising a second thrust and support element end; a lever rotatably supported to the thrust and support element for rotating at least along a rotation thrust direction; the lever comprising a first lever end adapted to cooperate with a second jaw of the brake; the lever comprising a second lever end, wherein the second lever end comprises a hooking seat; and wherein the hooking seat is adapted to firmly receive a connecting portion of a coupling end of a traction cable, the traction cable having a cable body capable of an elastic (Continued)

flexural deformation; the hooking seat being arranged undercut with respect to the rectilinear development direction of the cable body; the lever being adapted to oscillate; wherein the lever comprises a lever abutment surface which cooperates with a stop abutment counter-surface provided in the thrust and support element to prevent a free rotation of the lever in the opposite direction to the rotation thrust direction; the thrust and support element and the second lever end delimiting a guide channel which allows the passage of at least the coupling end; the guide channel allowing the coupling end to rotate about the second lever end and to be coupled to the hooking seat upon the elastic return of the cable body to a substantially straight cable body position, preventing the rotation of the lever in the opposite direction to the rotation thrust direction.

19 Claims, 12 Drawing Sheets

(51) Int. Cl.
  *F16D 65/52* (2006.01)
  *F16D 65/56* (2006.01)
  *F16D 121/14* (2012.01)
  *F16D 125/28* (2012.01)
  *F16D 125/62* (2012.01)
  *F16D 127/02* (2012.01)
  *F16D 129/04* (2012.01)

(52) U.S. Cl.
  CPC ...... *F16D 2121/14* (2013.01); *F16D 2125/28* (2013.01); *F16D 2125/62* (2013.01); *F16D 2127/02* (2013.01); *F16D 2129/04* (2013.01); *F16D 2250/0084* (2013.01)

(58) Field of Classification Search
  CPC ......... F16D 2125/28; F16D 2250/0084; F16D 65/52; F16D 65/565; B60T 11/046
  See application file for complete search history.

(56) References Cited

U.S. PATENT DOCUMENTS

| 5,180,037 | A | | 1/1993 | Evans |
| 5,311,793 | A | * | 5/1994 | Panek ...................... F16D 65/22 |
| | | | | 74/500.5 |
| 5,706,914 | A | * | 1/1998 | Goldstein ............. B60T 11/046 |
| | | | | 188/2 D |
| 6,318,207 | B1 | * | 11/2001 | Asai .......................... F16C 1/12 |
| | | | | 188/106 A |
| 6,325,183 | B2 | * | 12/2001 | Kurihara ................ F16D 51/50 |
| | | | | 188/106 F |
| 6,412,609 | B2 | | 7/2002 | Asai |
| 6,581,729 | B1 | * | 6/2003 | Moriwaki ................ F16C 1/12 |
| | | | | 188/106 A |
| 6,679,354 | B1 | | 1/2004 | Sherman, II |
| 6,715,378 | B1 | * | 4/2004 | Nakao ....................... F16C 1/12 |
| | | | | 74/502.4 |
| 6,732,840 | B2 | * | 5/2004 | Ikeda ....................... F16D 51/20 |
| | | | | 188/106 A |
| 6,962,241 | B2 | * | 11/2005 | Ikeda ....................... F16D 65/18 |
| | | | | 188/2 D |
| 8,267,227 | B2 | | 9/2012 | Narayanan V. |
| 2002/0002870 | A1 | * | 1/2002 | Ikeda ........................ F16C 1/12 |
| | | | | 74/500.5 |
| 2002/0179378 | A1 | * | 12/2002 | Jones ...................... F16D 65/22 |
| | | | | 188/2 D |
| 2011/0100772 | A1 | | 5/2011 | Narayanan V. |

FOREIGN PATENT DOCUMENTS

| EP | 1265001 A2 | 12/2002 |
| JP | H0687740 U | 12/1994 |
| JP | 2001159437 A | 6/2001 |
| JP | 2002242965 A | 8/2002 |
| JP | 2007100911 A | 4/2007 |

* cited by examiner

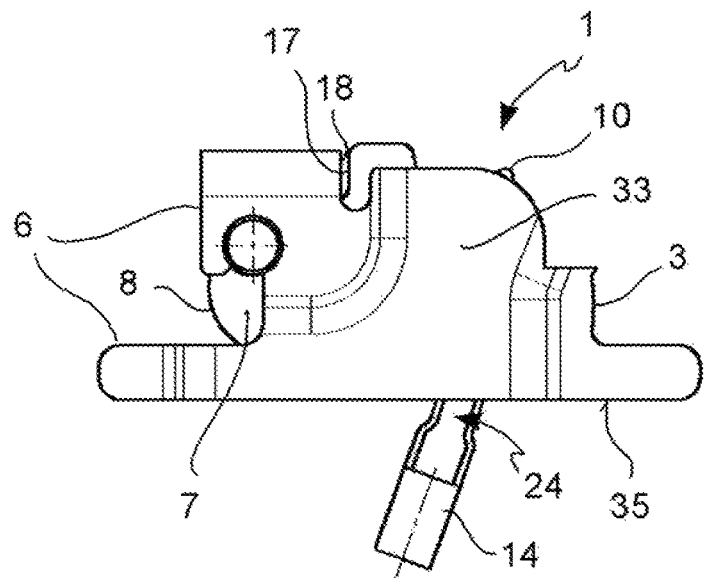
Fig. 13
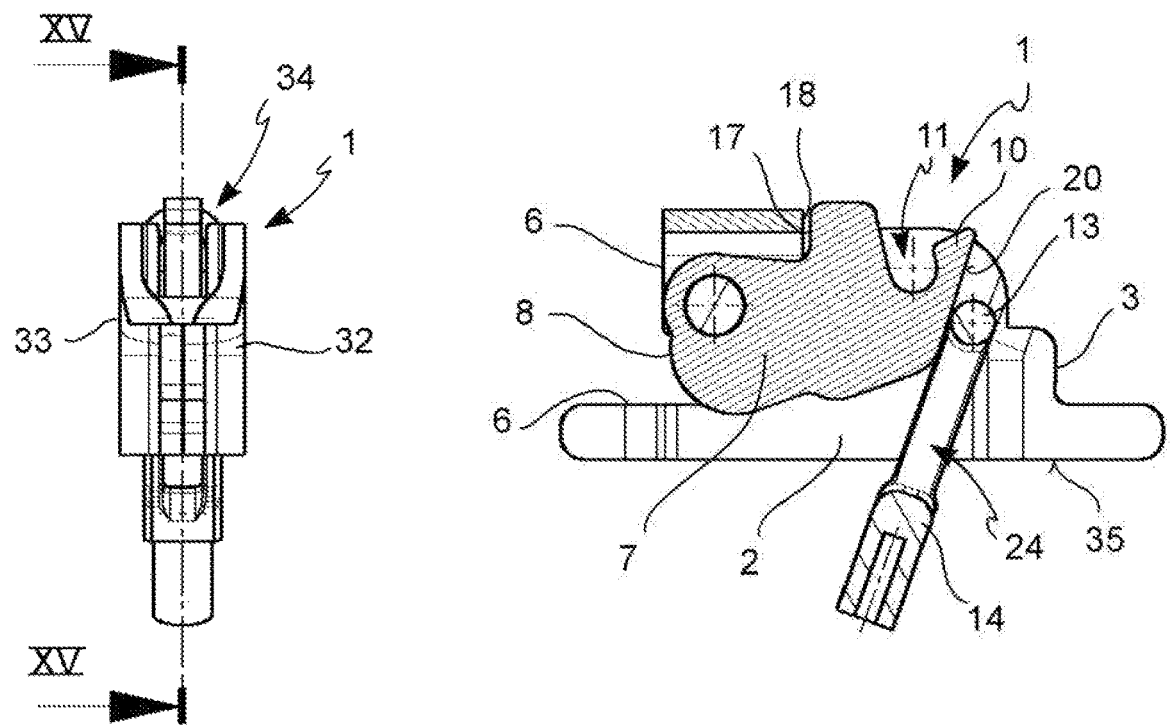
Fig. 14
Fig. 15

PARKING BRAKE ACTUATION ASSEMBLY

FIELD OF THE INVENTION

The present invention relates to a brake actuation assembly. In particular, the present invention relates to a brake of the drum-in-hat type, even more specifically a drum-in-hat type parking brake.

BACKGROUND ART

As known, parking brakes of the drum-in-hat type are highly used in four wheel vehicles because they reduce the construction complexity, and in particular the components, of a parking brake.

For example, document U.S. Pat. No. 5,180,037 shows a known solution of parking brake of the drum-in-hat type.

These types of brakes have a very limited wear of the friction material of the jaws. Indeed, usually parking brakes are used for keeping the vehicle stopped, e.g. parked. However, safety standards require the parking brake to operate as an emergency brake, which results in a sizing and safety operation thereof adapted to slow down and stop a vehicle under predetermined running conditions.

Solutions of this type are known for example from DE 102014204769 A1 and from US 2011/0100772 A1.

In addition to these functional aspects, it is of particular importance to emphasize that a parking brake of the drum-in-hat type is first mounted in the factory, and therefore in the vehicle assembly chain. More rarely, it is disassembled and reassembled for maintenance during the use of the vehicle due to the poor wear thereof.

However, the reduction of the assembly times especially in the assembly line of the vehicles is a very important factor which allows the costs of the vehicle itself to be reduced.

The construction simplicity of the brake has an even greater effect on the vehicle construction times and costs, and especially the coupling simplicity of the control cable, which is usually a Bowden cable, to the brake actuation device. The end of the cable is securely connected to a lever of the actuation device, which device may also be very difficult to reach or connect since it is positioned inside the bell of a disc for disc brake.

In this context, it is obviously increasingly important for the brake actuation assembly not only to be of simple construction, but of simple assembly, or rather the need is highly felt to be able to connect the end of the control wire to the actuation assembly in a "blind" manner, i.e. without the need for the assembly operator to see the lever and the hooking seat for the end of the cable. Everything is to be assembled not only in a "blind" but also in a secure manner, i.e. so as to prevent an accidental uncoupling of the actuation assembly cable, an uncoupling which would result in serious and unacceptable risk for the occupants of the vehicle.

In order to satisfy this need, solutions are known where the traction cable may be coupled to the brake actuation assembly without the assembly operator having to exactly identify the assembly direction and position. For example, solutions are known from documents U.S. Pat. No. 8,267,227 B2 and U.S. Pat. No. 6,679,354 B1.

However, these known solutions obligate the handling of various parts of the assembly for the correct assembly of the traction cable. For example, in these known solutions, there is a need for the rotation of the lever in opposite direction to the useful one for actuating the brake, and also the by-passing of a safety spring, therefore making the assembly in any case complex.

Other solutions, with even more complicated assembly, are known from EP 1.265.001 B1 and U.S. Pat. No. 6,412,609 B2.

In particular, in order to properly operate, these known solutions often require springs which constantly affect the movement of the actuation lever, thus making the actuation assembly complex to be constructed in addition to assembling, and even cumbersome.

The need is therefore felt to provide a brake actuation assembly, in particular a parking brake of the drum-in-hat type, which allows the problems of the solutions of the known art to be resolved, and in particular allows a secure and automatic, or blind, assembly, to be obtained.

Moreover, the need is felt to provide a brake actuation assembly which is simple to make.

The even greater need is felt to provide a brake actuation assembly which has a reduced number of components.

The need is also felt to reduce the overall volume of the brake actuation assembly.

Solution

It is an object of the present invention to obviate the drawbacks of the prior art and to provide a solution to the need to provide an assembly as defined in the appended claims.

The above-mentioned needs may be met and in particular, a compact brake actuation assembly may be provided having a reduced number of components, which is simple to construct and especially to securely assemble in a blind manner due to a brake actuation assembly which comprises a thrust and support element, a lever rotatably supported to said thrust and support element which in particular provides a hooking seat, for example arranged undercut with respect to the rectilinear development direction of a traction cable which is coupled to the lever, and in particular due to the provision of a lever abutment surface which cooperates with an abutment counter-surface provided in the thrust and support element in order to prevent a free rotation of the lever in opposite direction to the rotation thrust direction of the lever to actuate the brake, and due to the provision of a guide channel between said thrust and support element and said lever, which guide channel allows the passage at least of the coupling end of the traction cable when it is elastically bent, thus allowing the coupling end of the traction cable to rotate about the end of the lever and engage therewith, for example by coupling it undercut to the hooking seat.

In particular, due to the provision of the channel and the lever abutment and counter-abutment of the thrust and support element, it may be avoided to provide a spring which affects the lever to allow, as is required in the solutions of the known art, the return to the position of the lever after the forced movement thereof in counter-rotation by the traction cable during assembly.

Indeed, the coupling of the cable to the lever occurs without lifting or in any case moving the lever itself, due to the assembly proposed.

This allows having decidedly more compact and optimized sizes of the assembly with respect to the solutions of the known art.

In particular, it is avoided to use springs or clips for coupling the cable to the lever, thus taking advantage of the bending elasticity of the body of the traction cable to by-pass the lever and prevent a movement thereof when coupled to the hooking seat so that the cable remains restrained to the hooking seat of the lever.

Despite the lack of springs or clips in the solution proposed, the involuntary release of the cable is prevented, due also to the provision of the guide channel arranged between the lever and the thrust and support element which has such sizes such as to prevent the cable to by-pass the lever when it is in non-bent or straight position.

However, again due to the guide channel, the voluntary release is easy during the possible step of servicing the brake, by elastically bending the traction cable, by means of an intervention outside the assembly, and folding the end thereof so that it by-passes the lever.

In particular, due to the provision of a channel delimited by the thrust and support element and of the lever, the assembly of the cable occurs in an unequivocal manner and without possibility of error by the operator, and the disassembly instead occurs only if the operator carries out the elastic bending of the cable.

In particular, the assembly is simple to make and couple due to the solution proposed.

This and other objects are achieved by an assembly according to claim 1.

Certain advantageous embodiments are the subject of the dependent claims.

DRAWINGS

Further features and advantages of the assembly according to the invention will become apparent from the description provided below of preferred embodiments thereof, given by way of non-limiting example, with reference to the accompanying drawings, in which:

FIG. 13 depicts a front view of the assembly in FIG. 12;

FIG. 14 depicts a side view of the assembly in FIG. 12;

FIG. 15 depicts the assembly in FIG. 14 in a section according to line XV-XV;

DESCRIPTION OF SOME PREFERRED EMBODIMENTS

Figure 1:
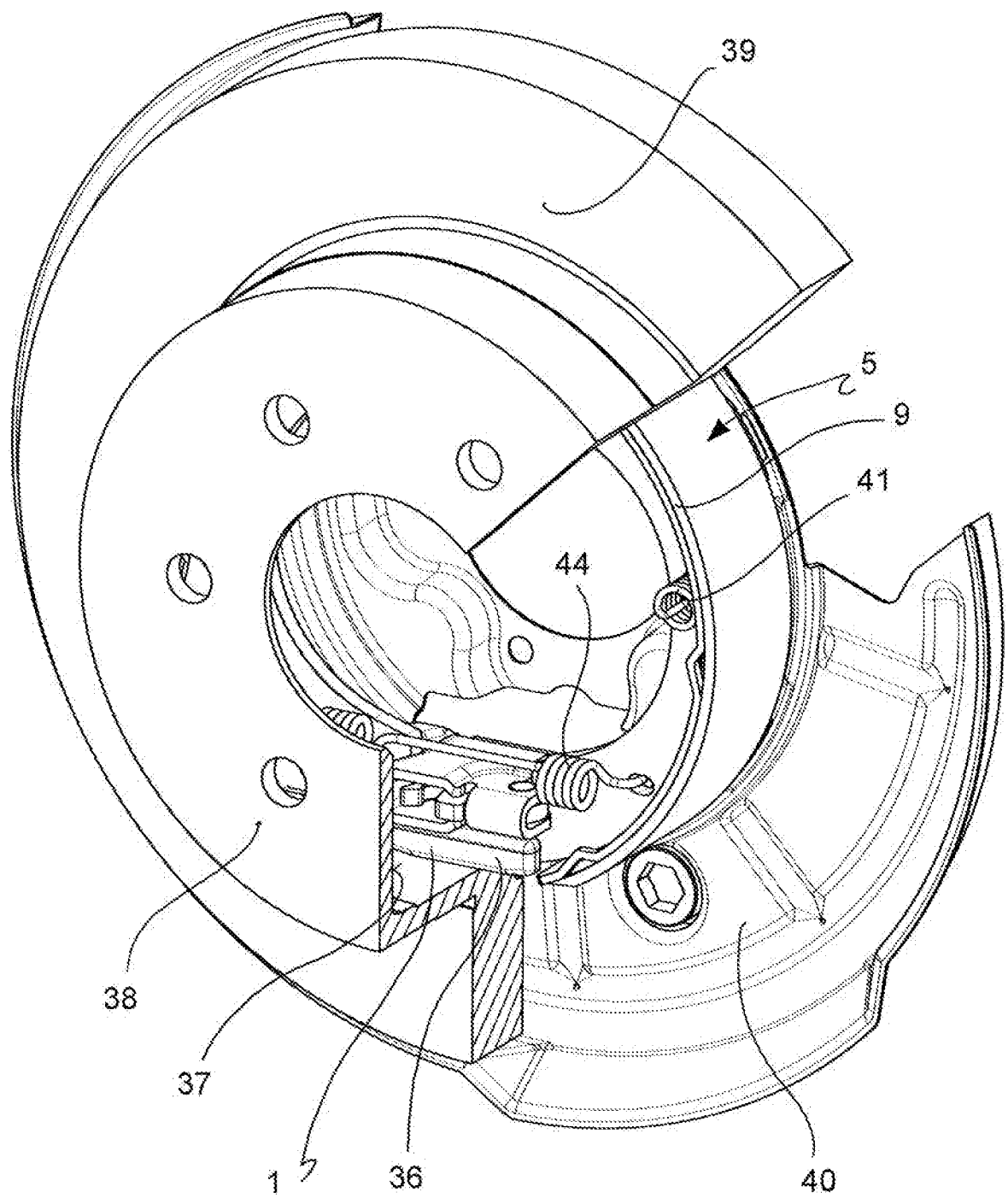
FIG. 1 depicts a partially sectioned axonometric view of a disc assembly of disc brake and parking brake of the drum-in-hat type, comprising a brake actuation assembly according to the invention.
Figure 2:
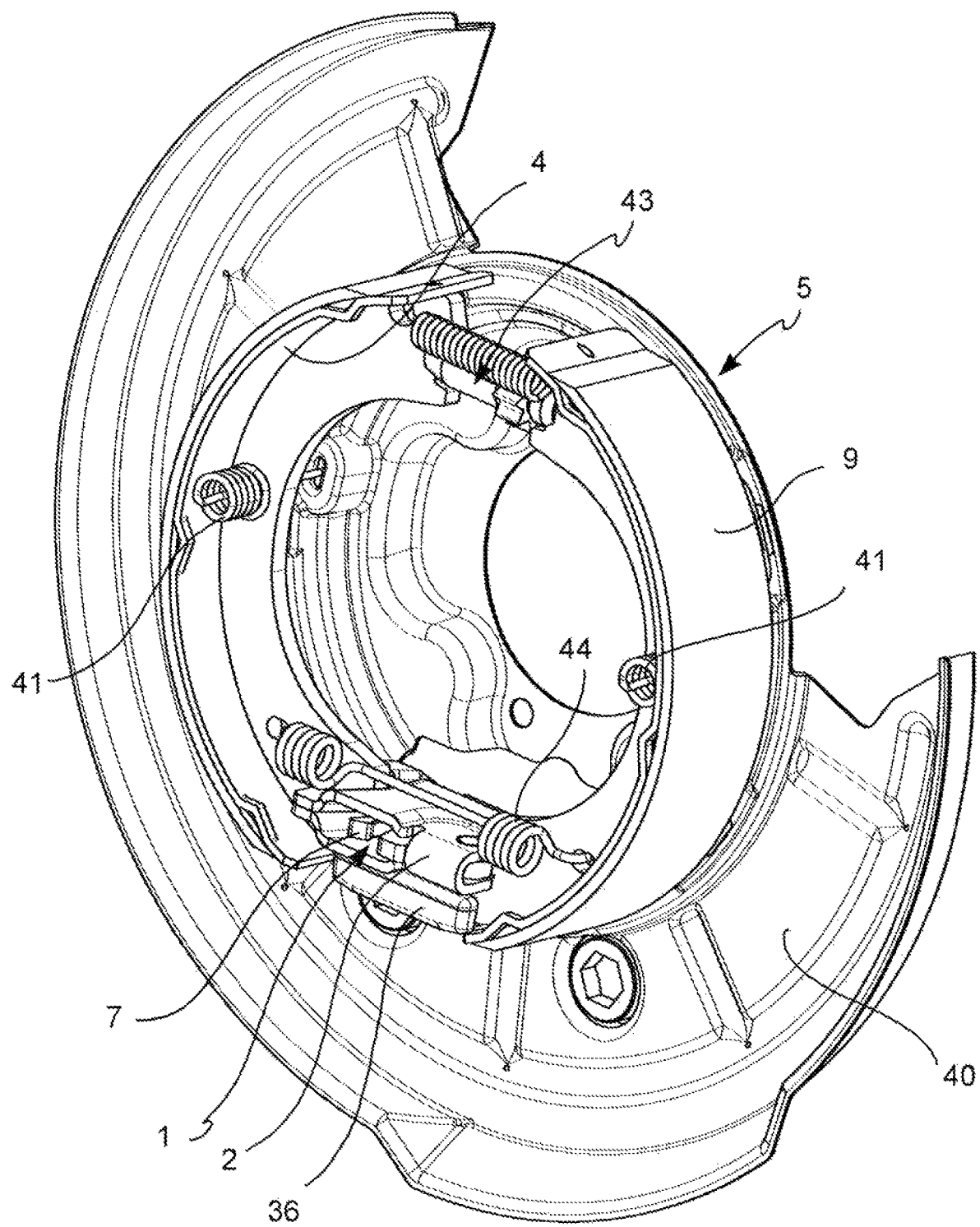
FIG. 2 depicts an axonometric view of the brake in FIG. 1, in which the disc of disc brake was removed to emphasize the parking brake.
Figure 3:
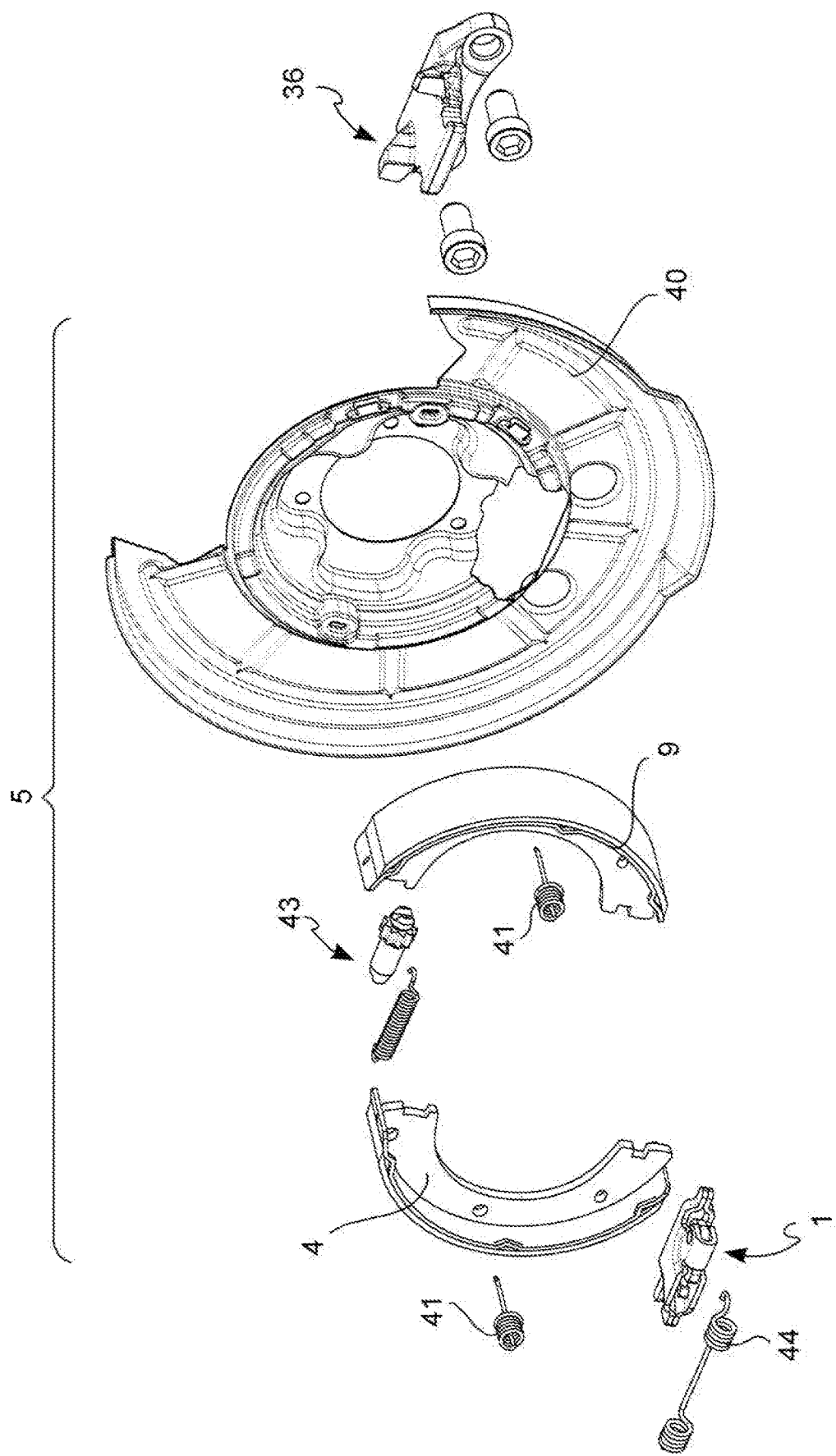
FIG. 3 depicts the parking brake in FIG. 2 in axonometric view and with separate parts.
Figure 4:
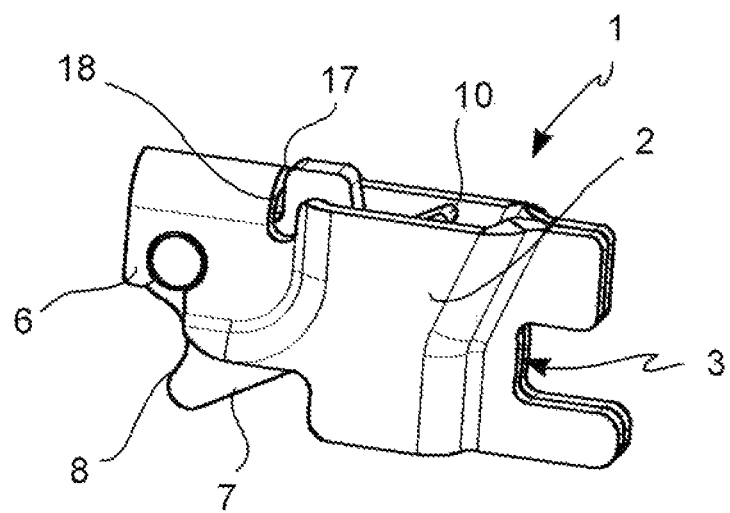
FIG. 4 depicts an axonometric view of a brake actuation assembly.
Figure 5:
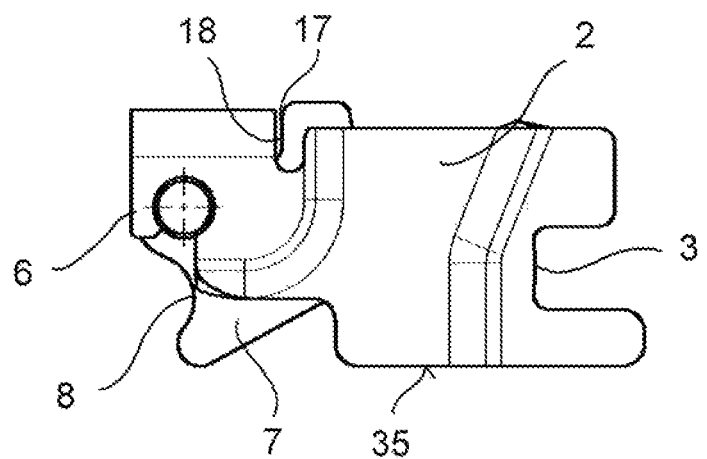
FIG. 5 depicts a side view of the assembly in FIG. 4.
Figure 6:
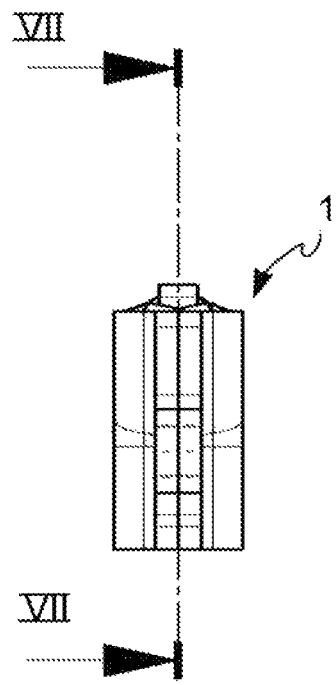
FIG. 6 depicts a side view of the assembly in FIG. 4.
Figure 7:
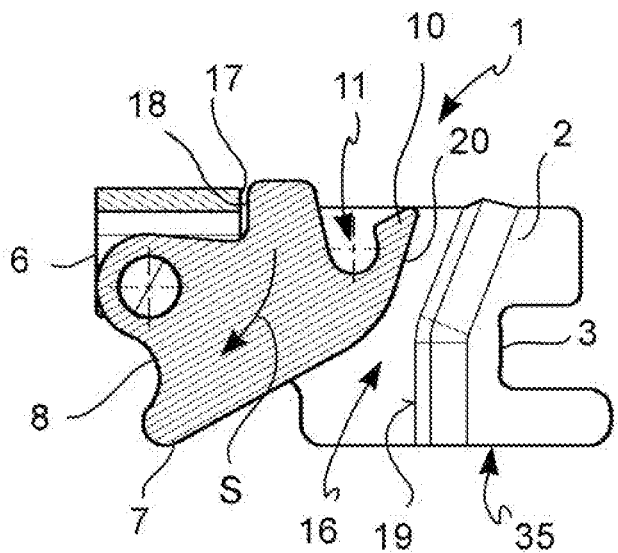
FIG. 7 depicts a longitudinal section of the assembly in FIG. 6, according to line VII-VII.
Figure 8:
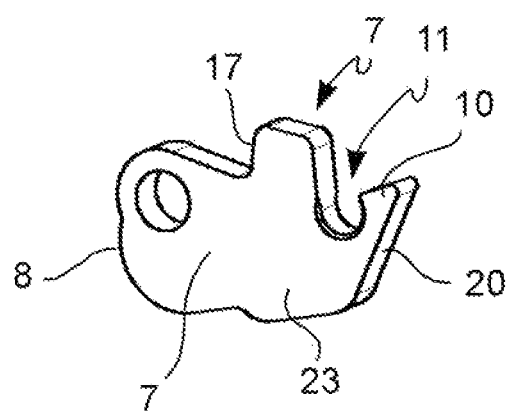
FIG. 8 depicts an axonometric view of a lever of a brake actuation assembly according to a further embodiment.
Figures 9, 10, 11:
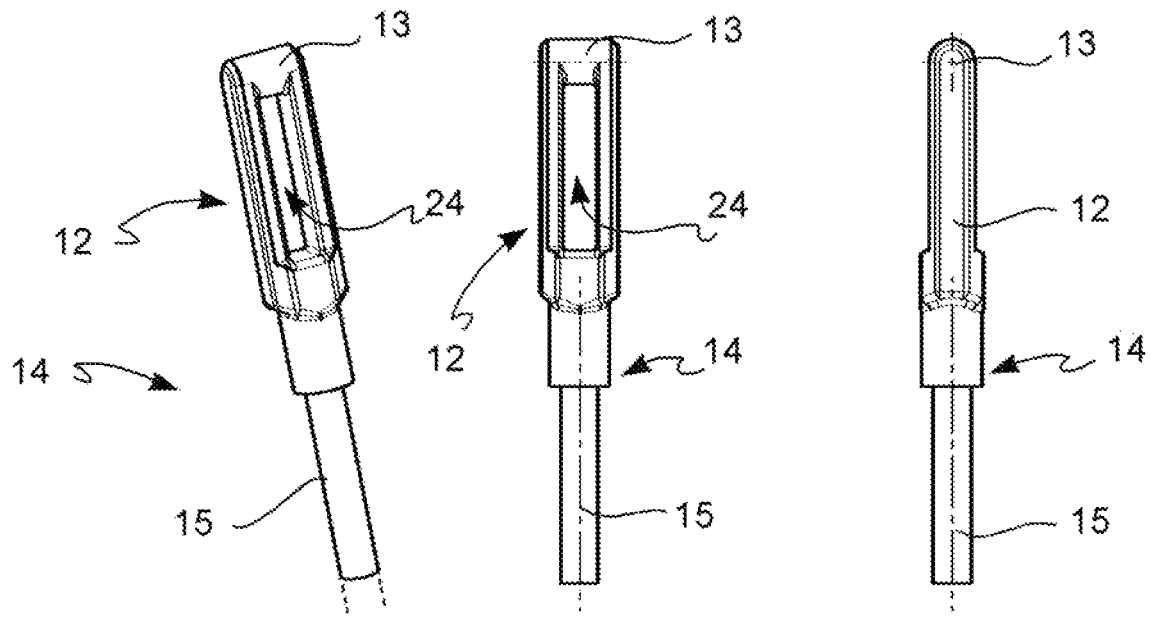
FIG. 9 depicts an axonometric view of a traction cable, and in particular the connecting portion and the coupling end thereof.
FIG. 10 depicts a side view of the traction cable in FIG. 9.
FIG. 11 depicts a front view of the traction cable in FIG. 9.
Figure 12:
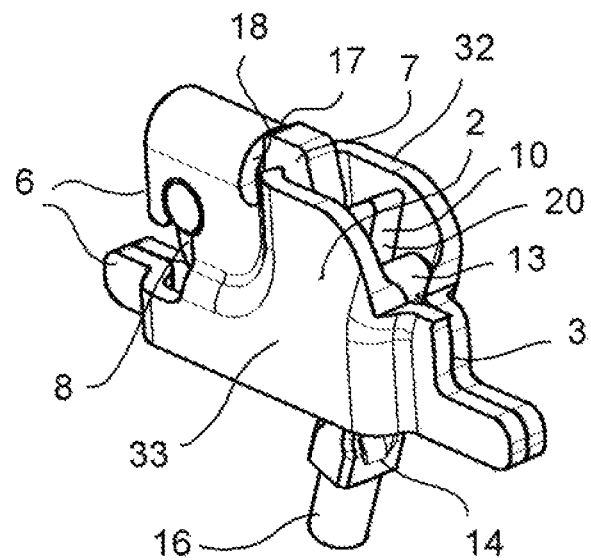
FIG. 12 depicts an axonometric view of a brake actuation assembly in a step of assembling the traction cable and according to a further embodiment.
Figure 16:
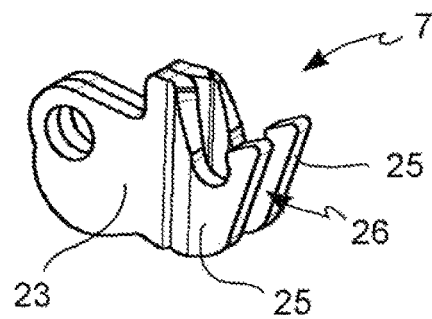
FIG. 16 depicts an axonometric view of a lever of a brake actuation assembly according to a further embodiment.
Figures 17, 18, 19:
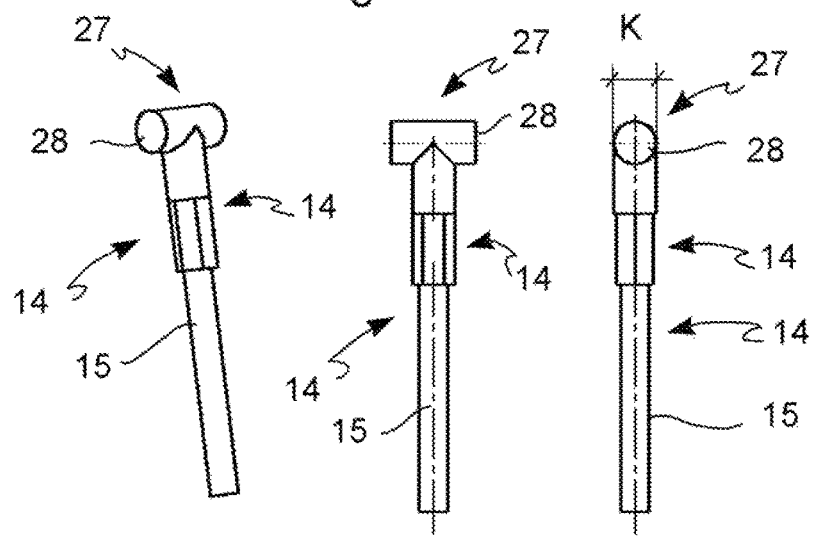
FIGS. 17, 18, 19 depict an axonometric side and front view of a traction cable, and in particular the connecting portion and the coupling end of the traction cable according to a further embodiment.
Figures 20, 21:
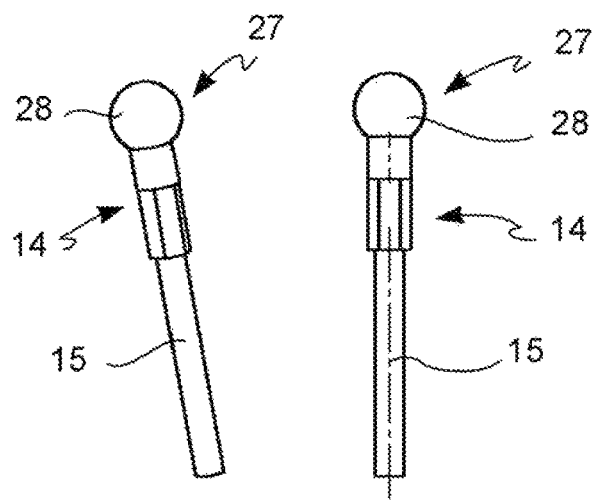
FIGS. 20 and 21 depict an axonometric and side view of a traction cable, and in particular the connecting portion and the coupling end of the traction cable, according to a further embodiment.
Figure 22:
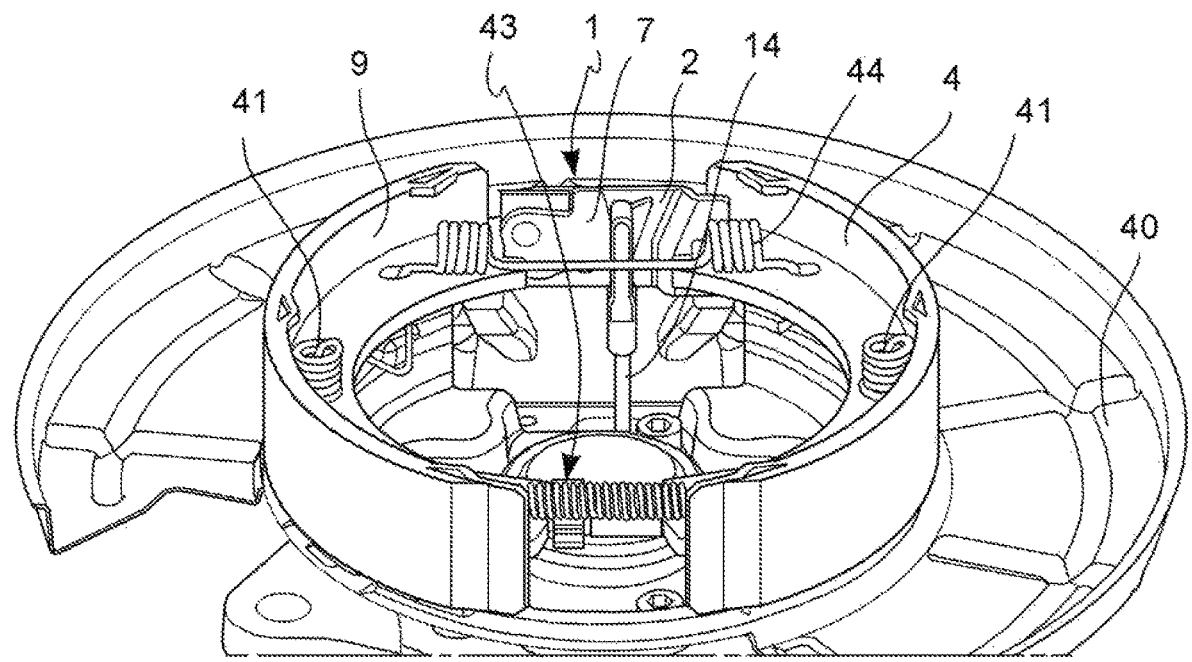
FIGS. 22, 23, 24, 25, 26, 27 depict an axonometric view of a parking brake of the drum-in-hat type, in which there are depicted the various operating steps of the brake actuation assembly.
Figure 23:
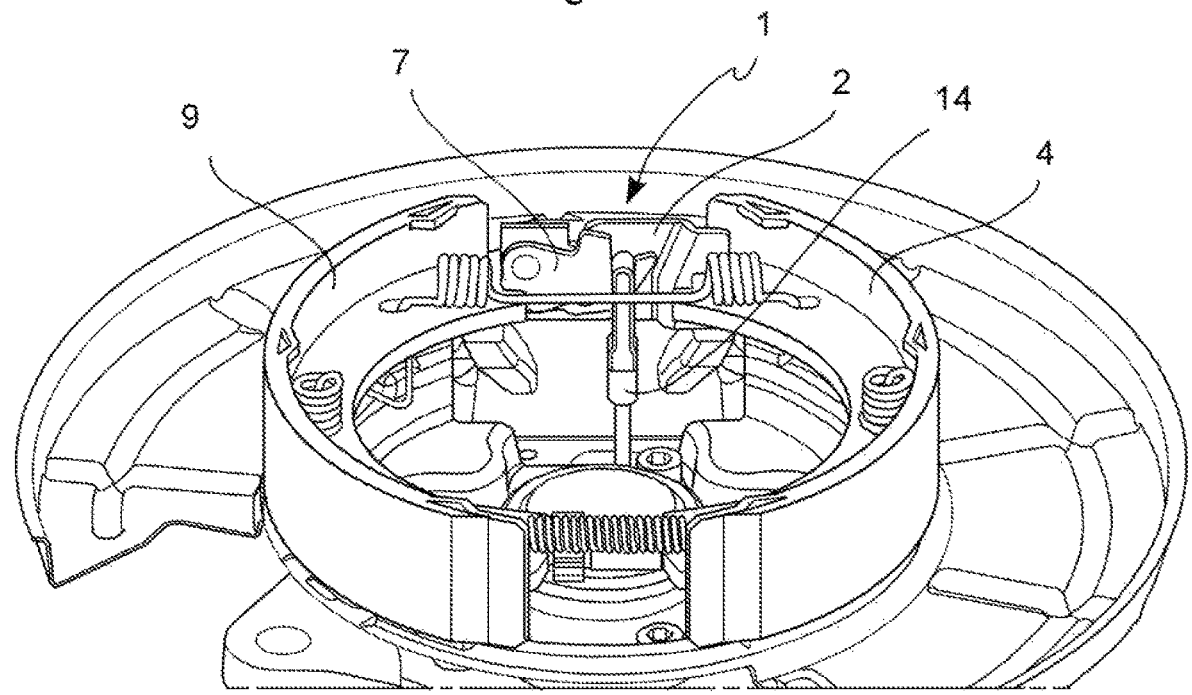
Figure 24:
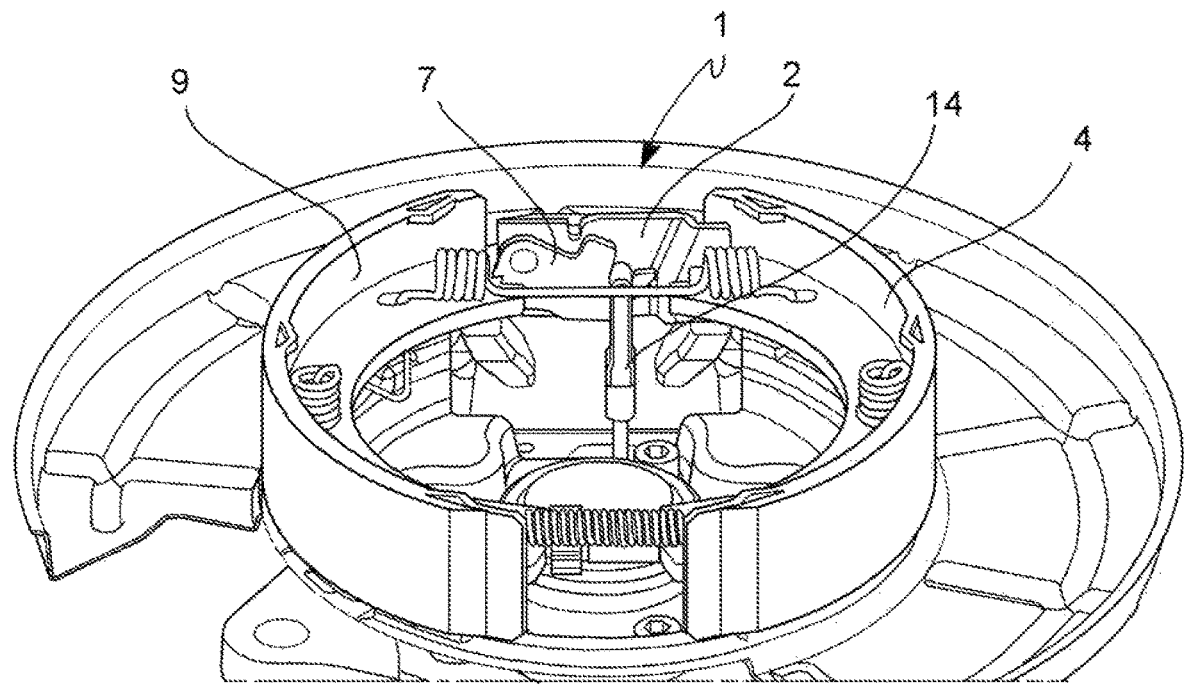
Figure 25:
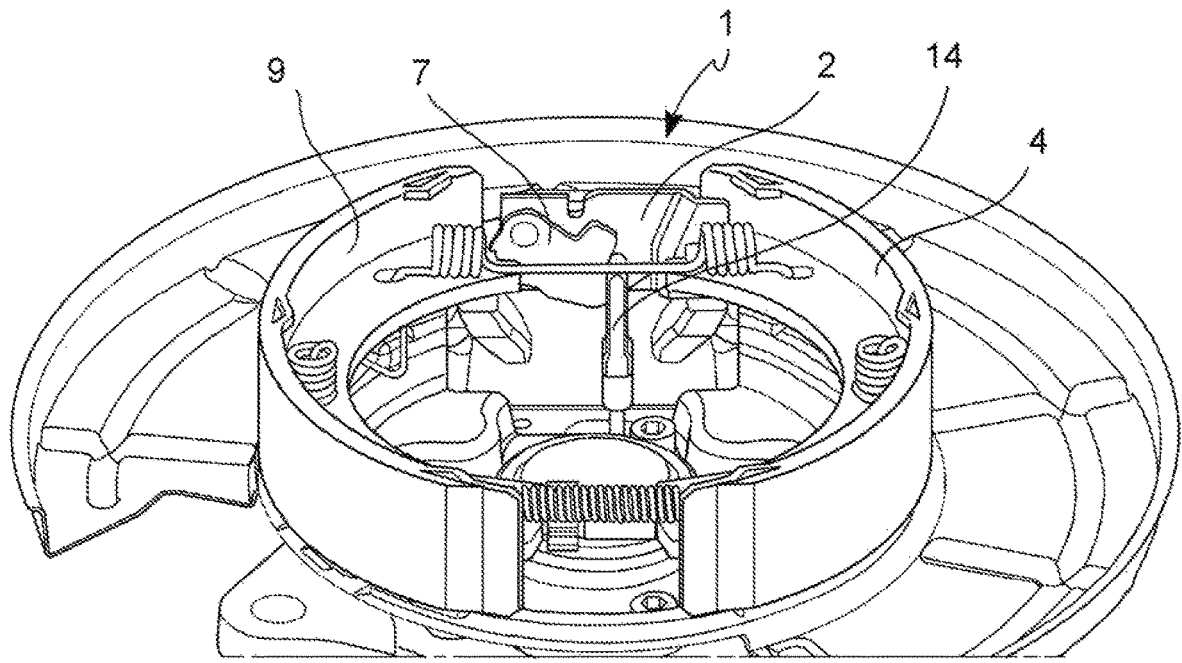
Figure 26:
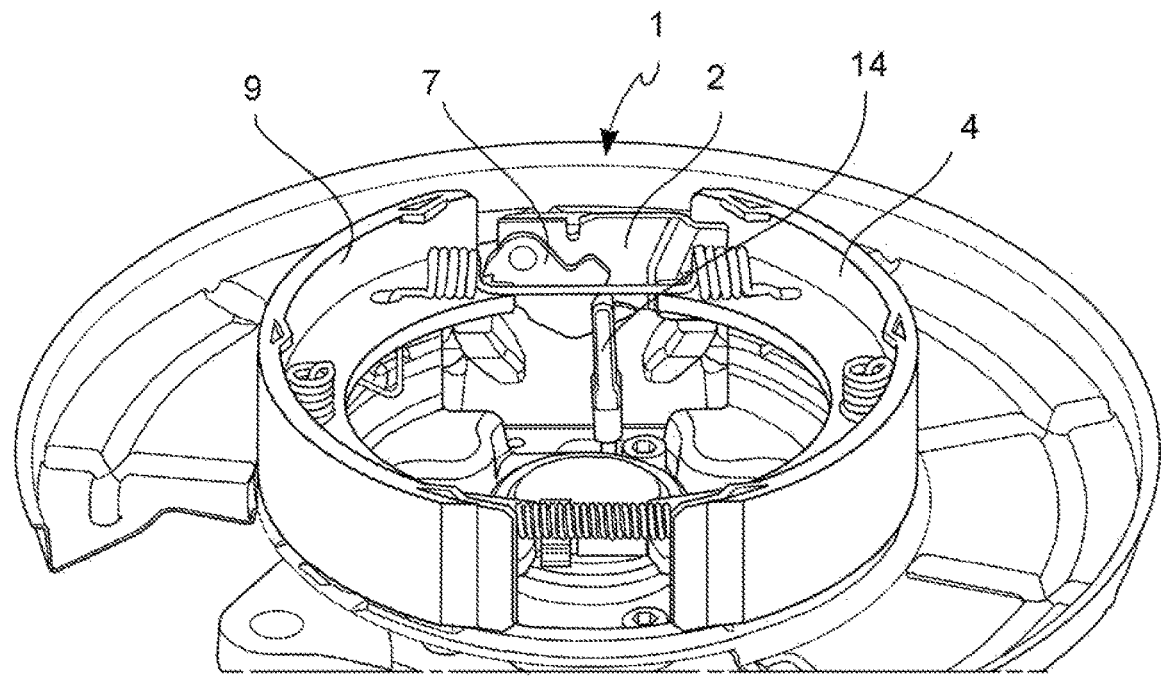
Figure 27:
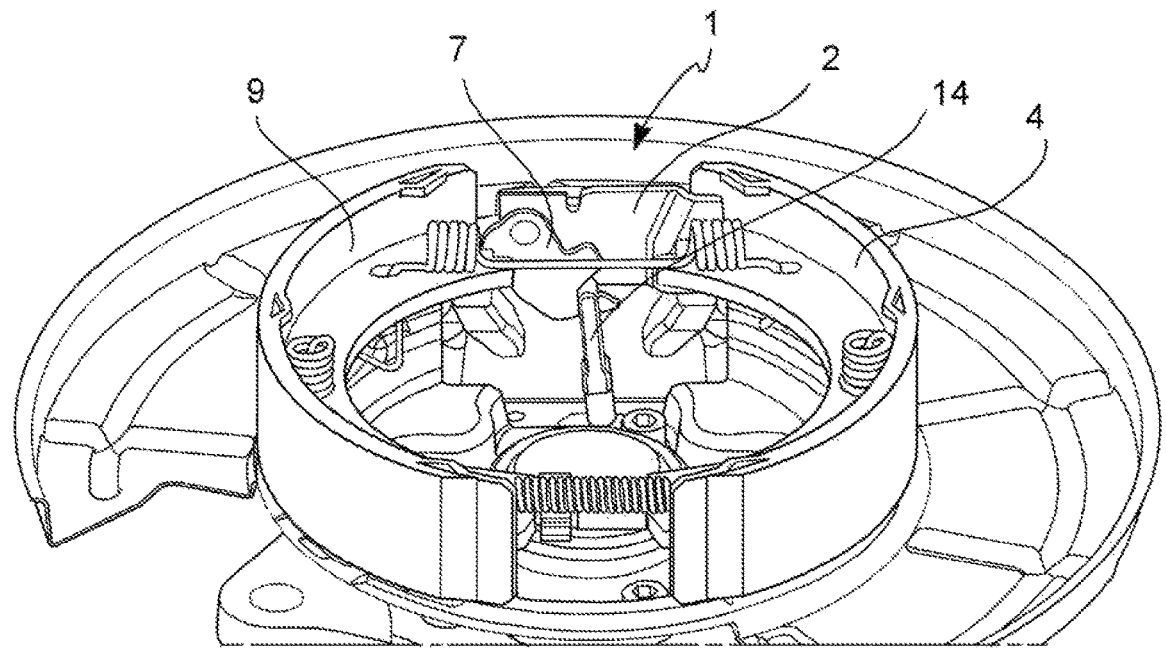

Below, "longitudinal direction" means a direction (T-T) parallel to the action direction of the brake actuation assembly. "Direction of traction cable" means a direction (X-X) parallel to the axis of the traction cable, at least of the end portion thereof, when this traction cable is in non-bent conditions. "Axial direction" means a direction (A-A) parallel to the rotation axis of the brake disc. "Rotation thrust direction", hereinafter indicated with S, means a circular direction or direction of limited rotation or oscillation of the lever to exert the braking action on the parking brake.

With reference to the figures, a brake actuation assembly 1 comprises a thrust and support element 2.

Said thrust and support element 2 comprises a first thrust end 3 of thrust and support element adapted to cooperate with a first jaw 4 of a brake 5, e.g. a parking brake.

Said thrust and support element 2 comprises a second thrust and support element end 6, adapted to be associated with a second brake jaw 9.

Said assembly 1 further comprises a lever 7 freely rotatably supported to said thrust and support element 2 for rotating at least along a rotation thrust direction S.

Said lever 7 comprises a first lever end 8 adapted to cooperate with a second jaw 9 of brake 5, for exerting a braking action during the limited rotation or oscillation thereof.

Said lever 7 comprises a second lever end 10.

Said second lever end 10 comprises a hooking seat 11 adapted to receive a coupling end 13 of a traction cable.

In particular, said hooking seat 11 is adapted to firmly receive a connecting portion 12 of a coupling end 13 of a traction cable 14.

Said traction cable 14 comprises a cable body 15 capable of an elastic flexural deformation which allows it to return to the straight position (resting direction XX of elastic traction cable) when the bending stress is removed.

According to one embodiment, said hooking seat 11 is arranged undercut with respect to the rectilinear development direction X-X of the cable body 15, in particular along the connection direction thereof to the lever.

Said lever 7 is adapted to rotate only, for example about a pin, or oscillate when subjected to the traction action of the traction cable 14, to act with the first lever end 8 against said second jaw 9 of brake 5 and exert a braking action.

Advantageously, said lever 7 comprises a lever abutment surface 1 which cooperates with an abutment countersurface 18 provided in said thrust and support element 2 to prevent a free rotation of the lever in the opposite direction to said rotation thrust direction S).

Said thrust and support element 2 and said second lever end 10 delimit a guide channel 16 which allows the passage of at least the coupling end 13 when the cable body 15 is elastically bent.

Said guide channel 16 allows the coupling end 13 to rotate about said second lever end 10 and engage with said hooking seat 11 upon the elastic return of the cable body 15 to substantially straight cable body 15 position, thus preventing the rotation of the lever in the opposite direction to said rotation thrust direction S when the coupling end 13 rotates about said second lever end 10.

According to one embodiment, said thrust and support element 2 comprises an inner element wall 19 which at least partly delimits said guide channel 16.

According to one embodiment, said lever comprises a lever inclined wall 20 which at least partly delimits said guide channel 16.

According to one embodiment, said lever inclined wall 20 forms a slide which guides said connecting portion 12 of the traction cable 14 in said guide channel 16 by forcing the bending of said elastic cable body 15 in bending from its rectilinear balance direction to the bent bypassing direction of the second lever end for the coupling of the coupling end 13 of the traction cable 14 to said hooking seat 11 of lever 7.

Figure 28:
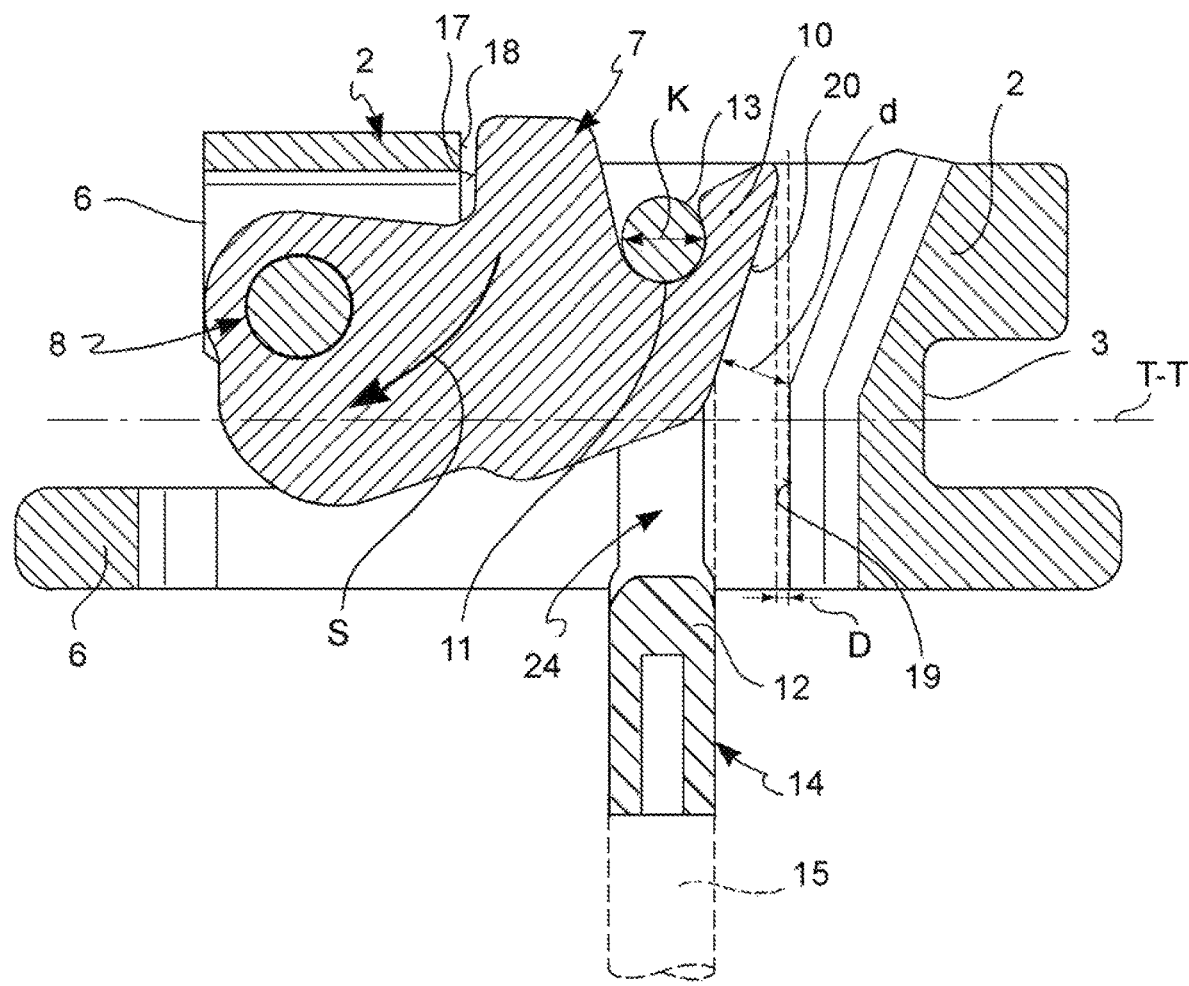
FIG. 28 depicts a longitudinal section of a brake actuation assembly in a position in which the coupling end of a traction cable is housed with a portion thereof in the hooking seat of the lever arranged in non-actuated position, and in which there are emphasized the sizes of the guide channel.

According to one embodiment, said inner element wall 19 and said lever inclined wall 20 define a minimum distance from each other, indicated in FIG. 28 with "d".

Said coupling end 13 has a longitudinal extension thereof and a maximum transverse dimension (indicated in FIG. 28 with "K") to the longitudinal extension thereof. Said transverse dimension K has dimensions equal to or preferably smaller than the minimum distance d between said inner element wall 19 and said lever inclined wall 20, i.e. mathematically:

$$k \leq d$$

According to one embodiment, the safety distance (indicated in FIG. 28 with "D") between:

a first straight line (indicated in FIG. 28 with "R1"), parallel to the rectilinear extension of the traction cable 14 in non-bent position, passing by a lever end 21 arranged at the end of the coupling end 13 of the lever
and
a second straight line (indicated in FIG. 28 with "R2"), parallel to the rectilinear extension of the traction cable 14 in non-bent position, passing by an inner wall end 22 arranged at the end of the inner element wall 19 which substantially faces lever 7, in which
said safety distance D is less than the maximum transverse dimension K of said coupling end 13; in mathematical terms:

$$D < K.$$

According to one embodiment, said lever 7 comprises a plate-shaped lever body 23.

According to one embodiment, said coupling end 13 of said connecting portion 12 of the traction cable 14 comprises a cable slot 24 adapted to fit at least one portion of said second lever end 10 being coupled to said hooking seat 11.

According to one embodiment, said lever 7 comprises a lever body. Said lever body comprises two arms forming lever prongs 25 which are mutually spaced apart to delimit a central prong seat 26. Each prong 25 comprises a hooking seat 11 for coupling at least one portion of a coupling end 13 of the traction cable 14.

According to one embodiment, said coupling end 13 of the traction cable 14 comprises an enlarged head 27 adapted to be coupled on both hooking seats 11 of the prongs 25, for example a "hammer"-shaped head and a spherical head of maximum dimensions "k".

According to one embodiment, said enlarged head 27, for example hammer-shaped 28, comprises a portion transverse to the longitudinal extension of the traction cable (X-X).

According to one embodiment, said enlarged head 27 comprises a hemispherical or spherical portion 29.

According to one embodiment, said traction cable 14 is a Bowden cable. According to one embodiment, the sheath of the Bowden cable is fixed to an abutment stop 36, for example provided fixed to the vehicle, for example to the suspension of the vehicle to also allow the resting of the assembly and the discharge of the braking actions exerted by the jaws. The sliding portion of the Bowden cable comes out and couples to lever 7 as described above.

According to one embodiment, said thrust and support element 2 comprises an element body 30 of the box type.

According to one embodiment, said box body 30 comprises a cut and shaped and/or bent metal sheet 31. According to one embodiment, said body 30 is obtained by means of the pressing technique or from a solid by processing or additing or rapid prototyping.

According to one embodiment, said bent metal sheet 31 forms two substantially facing walls 32 and 33 which delimit a central lever seat 34 which houses lever 7.

According to one embodiment, said bent metal sheet 31 comprises, in the zone of the first thrust end 3, the two facing walls 32 and 33 deformed and brought into contact with each other, thus defining said inner element wall 19.

According to one embodiment, said thrust and support element 2 comprises a support surface 35 adapted to place the element resting on an abutment stop 36 adapted to allow the thrust and support element 2 to rest and be supported in order to counteract the action of the traction cable 14, and to allow the ends of the jaws 4 and 9 to rest.

According to a general embodiment, the present invention also relates to a brake 42 comprising an assembly 1 according to any one of the embodiments described above.

According to one embodiment, said brake is of the drum-in-hat type in which the jaws 4 and 9 cooperate with an inner cylindrical surface 37 of a bell 38 of a disc for disc brake 39.

According to one embodiment, said brake comprises a disc-shaped support plate 40 adapted to place the jaws 4 and 9 resting in the axial direction A-A, or in a direction parallel to or coincident with the rotation axis of the disc of disc brake 39, disc-shaped support plate 40 which closes the compartment consisting of bell 38 and in which there are inserted at least the jaws and the actuation assembly.

According to one embodiment, a return spring 41 cooperates with said jaws 4 and 9 to hold them in axial abutment against said disc-shaped support plate 40.

According to one embodiment, said brake 42 comprises a tangential spring 44 connected to said jaws 4 and 9 to recall them away from said inner cylindrical surface 37 of bell 38 upon the ending of the braking action.

According to one embodiment, said brake 42 comprises a clearance recovery device 43 adapted to maintain a predetermined distance of the jaws 4 and 9 from the inner cylindrical surface 37 of bell 38 in the event of wear of the jaws 4 and 9.

Those skilled in the art may make several changes and adaptations to the above-described embodiments of the assembly, and may replace elements with others which are functionally equivalent in order to meet contingent needs, without departing from the scope of the following claims. Each of the features described as belonging to a possible embodiment may be achieved irrespective of the other embodiments described.

Below there is described a method for assembling the assembly, for example for replacing or servicing the Bowden cable.

A method for assembling an assembly 1 comprises at least the steps of:
- providing a brake actuation assembly 1 as described in any one of the embodiments disclosed above;
- providing a traction cable 14;
- moving the connecting portion 12 of the coupling cable close to lever 7;
- exerting a thrust force on the traction cable 7 so that lever 7, stop abutted with the lever abutment surface 17 thereof against the abutment counter-surface of the thrust and support element 18, exerts a bending action on the traction cable 14 up to bringing the coupling end 13 in said guide channel 16;
- exerting a further thrust force on the traction cable 14 so as to cause the coupling end 13 to travel the guide channel 16 up to rotating about the second lever end 10;
- when the traction cable overcomes lever 7 with a portion of the coupling end 13 thereof, allowing the traction cable 14, which was elastically bent previously by lever 7, to return in straight position (X-X) due to the elastic recovery action thereof;
- lowering the portion of coupling end 13 of the traction cable 14 by inserting it into said hooking seat 11 of lever 7.

To disassemble the traction cable 14, simply lift, with a thrust action on cable 14, the portion of the coupling end 13 thereof inserted in the hooking seat 11 of lever 7 so as to by-pass it and with a tool, elastically bend the coupling end 13 of the traction cable 14 by pulling it so that it feeds into the guide channel 16 and comes out of the brake actuation assembly 1.

FIGS. 22 to 27 depict the braking action on a parking brake, here depicted without the disc of disc brake 39 which, with the bell 38 thereof, forms the inner cylindrical surface 37 on which the jaws 4 and 9 act. By pulling the traction cable 14, lever 7 rotates according to the rotation thrust direction S, moving away from the element abutment counter-surface 18 of the thrust and support element 2 and exerting a thrust action with the first lever end 8 thereof on the second jaw 9. Due to the rotational restraint between lever 7 and the thrust and support element, by reaction the thrust and support element 2 acts with the first thrust end 3 thereof against said first jaw 4, moving the jaws 4, 9 from each other so that they settle against the inner cylindrical surface 37 of the bell and exert the desired parking braking action.

At the end of the action, by releasing the traction action of the traction cable 14 due to the tangential spring, the jaws 4, 9 move away from the inner cylindrical surface 37 of the bell up to causing the lever abutment surface 17 to settle against the element abutment counter-surface 18.

LIST OF REFERENCES 1 brake actuation assembly
2 thrust and support element
3 first thrust end
4 first jaw
5 brake
6 second thrust and support element end
7 lever
8 first lever end
9 second jaw
10 second lever end
11 hooking seat
12 connecting portion
13 coupling end
14 traction cable
15 cable body
16 guide channel
17 lever abutment surface
18 element abutment counter-surface
19 inner element wall
20 lever inclined wall
21 lever end
22 inner wall end
23 plate-shaped lever body
24 cable slot
25 lever prongs
26 central prong seat
27 enlarged head
28 hammer-shaped transverse portion
29 hemispherical or spherical portion
30 element body
31 metal sheet
32 substantially facing walls
33 substantially facing walls
34 central lever seat
35 support surface
36 abutment stop
37 inner cylindrical surface
38 bell
39 disc for disc brake
40 disc-shaped support plate
41 return spring
42 brake
43 clearance recovery device
44 tangential spring
S rotation thrust direction
R1 first straight line passing by lever end
R2 second straight line passing by point most facing inner wall
d minimum distance (d) between said inner element wall (19) and said lever inclined wall (20)
k maximum transverse dimension of cable coupling end
D Safety distance between parallel straight lines of non-bent cable through lever ends and inner wall
X-X resting direction of elastic traction cable
A-A axial direction
T-T thrust direction

The invention claimed is:

1. A brake actuation assembly, comprising:
a thrust and support element comprising a first thrust end of thrust and support element adapted to cooperate with a first jaw of a brake; said thrust and support element comprising a second thrust and support element end;
a lever rotatably supported to said thrust and support element for rotating at least along a rotation thrust direction;
said lever comprising a first lever end adapted to cooperate with a second jaw of the brake;
said lever comprising a second lever end, wherein said second lever end comprises a hooking seat; and wherein said hooking seat is adapted to firmly receive a connecting portion of a coupling end of a traction cable, said traction cable having a cable body capable of an elastic flexural deformation that allows it to return to the straight position when the bending stress is removed;

said lever being adapted to rotate only when subjected to the traction action of the traction cable, for acting with the first lever end against said second jaw of brake; wherein said thrust and support element comprises an inner element wall which at least partly delimits a guide channel; and said lever comprises a lever inclined wall which at least partly delimits said guide channel;

wherein a safety distance (D) between a first straight line (R1), parallel to a rectilinear extension of the traction cable in a non-bent position, passing by a lever end located at an end of the coupling end of the lever, and a second straight line (R2), parallel to the rectilinear extension of the traction cable in a non-bent position, passing by an inner wall end located at an end of the inner element wall which substantially faces the lever wherein said safety distance (D) is less than a maximum transverse dimension (K) of said coupling end $$D<K$$

and wherein said inner element wall and a lever inclined wall therebetween define a minimum distance (d), wherein said maximum transverse dimension (K) is equal or less than the minimum distance (d) between said inner element wall and said lever inclined wall;

$$K \geq d$$

and wherein
said lever comprises a lever abutment surface which cooperates with an abutment counter-surface provided in said thrust and support element to prevent a free rotation of the lever in the opposite direction to said rotation thrust direction;

said thrust and support element and said second lever end define said guide channel which allows the passage of at least the coupling end when the cable body is elastically bent, to maintain said lever in a stationary position during both assembly or disassembly of the traction cable;

said guide channel allowing the coupling end to rotate about said second lever end and engage with said hooking seat upon the elastic return of the cable body in a cable body position substantially straight, preventing the rotation of the lever in the opposite direction to said rotation thrust direction when the coupling end rotates about said second lever end.

2. The assembly of claim 1, wherein
said lever inclined wall forms a slide which guides said connecting portion of the traction cable in said guide channel by bending of said elastic cable body in bending from its rectilinear balance direction to that bent bypassing the second lever end for the coupling, for example in the undercut of the coupling end of the traction cable to said hooking seat of the lever
and said hooking seat is arranged undercut with respect to the rectilinear development direction of the cable body.

3. The assembly of claim 1, wherein
said lever comprises a plate-shaped lever body; and
said coupling end of said connecting portion of the traction cable comprises a cable slot adapted to fit at least a portion of said second lever end coupling said hooking seat in the undercut.

4. The assembly of claim 1, wherein
said lever comprises a lever body comprising two arms forming lever prongs which are mutually spaced apart to delimit a central prong seat, each prong comprising a hooking seat for coupling a portion of a coupling end of the traction cable; and said coupling end of the traction cable comprises an enlarged head adapted to couple in the undercut on both coupling seats of the prongs; and said enlarged head comprises a hammer-shaped transverse portion; or said enlarged head comprises a hemispherical or spherical portion.

5. The assembly of claim 4 wherein
said enlarged head comprises a hammer-shaped transverse portion; or
said enlarged head comprises a hemispherical or spherical portion.

6. The assembly of claim 1, wherein
said traction cable is a Bowden cable.

7. The assembly of claim 6 wherein
said bent metal sheet forms two substantially facing walls which delimit a central lever seat which houses the lever; and said bent metal sheet comprises, in the zone of the first thrust end, the two facing walls deformed and brought in contact with each other, defining said inner element wall.

8. The assembly of claim 1, wherein
said thrust and support element comprises an element body of the box type; and wherein
said box body comprises a metal sheet cut and shaped and/or bent; and said thrust and support element comprises a support surface adapted to rest the element on an abutment stop adapted to allow the rest and support of the thrust and support element to counteract the action of the traction cable and for resting the ends of the jaws.

9. The assembly of claim 1, wherein the abutment counter-surface is integral with said thrust and support element.

10. The assembly of claim 1, wherein the lever abutment surface and the abutment counter-surface are parallel to a primary direction of the traction cable.

11. The assembly of claim 1, wherein the lever abutment surface and the abutment counter-surface are perpendicular to a tangential spring connected to the first and second jaws to recall them away from the inner cylindrical surface of a bell upon the ending of the braking action.

12. A brake comprising an assembly comprising:
a thrust and support element comprising a first thrust end of thrust and support element adapted to cooperate with a first jaw of a brake; said thrust and support element comprising a second thrust and support element end;

a lever rotatably supported to said thrust and support element for rotating at least along a rotation thrust direction;

said lever comprising a first lever end adapted to cooperate with a second jaw of the brake;

said lever comprising a second lever end, wherein said second lever end comprises a hooking seat; and wherein said hooking seat is adapted to firmly receive a connecting portion of a coupling end of a traction cable, said traction cable having a cable body capable of an elastic flexural deformation that allows it to return to the straight position when the bending stress is removed;

said lever being adapted to rotate only when subjected to the traction action of the traction cable, for acting with the first lever end against said second jaw of brake; wherein said thrust and support element comprises an inner element wall which at least partly delimits a guide channel; and said lever comprises a lever inclined wall which at least partly delimits said guide channel;

wherein a safety distance (D) between a first straight line (R1), parallel to a rectilinear extension of the traction cable in a non-bent position, passing by a lever end located at an end of the coupling end of the lever, and a second straight line (R2), parallel to the rectilinear extension of the traction cable in a non-bent position, passing by an inner wall end located at the end of an inner element wall which substantially faces the lever wherein said safety distance (D) is less than a maximum transverse dimension (K) of said coupling end $$D<K$$

and wherein said inner element wall and the lever inclined wall therebetween define a minimum distance (d), wherein said maximum transverse dimension (K) is equal or less than the minimum distance (d) between said inner element wall and said lever inclined wall;

$$K \geq d$$

wherein said lever comprises a lever abutment surface which cooperates with an abutment counter-surface provided in said thrust and support element to prevent a free rotation of the lever in the opposite direction to said rotation thrust direction;

said thrust and support element and said second lever end define said guide channel which allows the passage of at least the coupling end when the cable body is elastically bent, to maintain said lever in a stationary position during both assembly or disassembly of the traction cable;

said guide channel allowing the coupling end to rotate about said second lever end and engage with said hooking seat upon the elastic return of the cable body in a cable body position substantially straight, preventing the rotation of the lever in the opposite direction to said rotation thrust direction when the coupling end rotates about said second lever end.

13. The brake of claim 12, wherein said brake is of the drum-in-hat type in which the jaws cooperate with an inner cylindrical surface of a bell of a disc for disc brake.

14. The brake of claim 12, wherein
a return spring cooperates with said jaws to hold them in axial abutment against said disc-shaped support plate; and said brake comprises a tangential spring connected to said jaws to recall away from said inner cylindrical surface of the bell upon ending of the braking action; and said brake comprises a clearance recovery device adapted to maintain a predetermined distance of the jaws from the inner cylindrical surface of the bell in the event of wear of the jaws.

15. The brake of claim 14, wherein the lever abutment surface and the abutment counter-surface are perpendicular to the tangential spring connected to the first and second jaws to recall them away from the inner cylindrical surface of the bell upon the ending of the braking action.

16. The brake of claim 12, wherein a disc-shaped support plate is comprised, adapted for resting the jaws in an axial direction or a direction parallel to or coincident with the axis of rotation of the disc of disc brake, disc-shaped support plate which closes the compartment formed by the bell.

17. The brake of claim 12, wherein the lever abutment surface and the abutment counter-surface are parallel to a primary direction of the traction cable.

18. A brake actuation assembly, comprising:
a thrust and support element comprising a first thrust end of thrust and support element adapted to cooperate with a first jaw of a brake; said thrust and support element comprising a second thrust and support element end;

a lever rotatably supported to said thrust and support element for rotating at least along a rotation thrust direction;

said lever comprising a first lever end adapted to cooperate with a second jaw of the brake;

said lever comprising a second lever end, wherein said second lever end comprises a hooking seat; and wherein said hooking seat is adapted to firmly receive a connecting portion of a coupling end of a traction cable, said traction cable having a cable body capable of an elastic flexural deformation that allows it to return to the straight position when the bending stress is removed;

said lever being adapted to rotate only when subjected to the traction action of the traction cable, for acting with the first lever end against said second jaw of brake; wherein said lever comprises a lever abutment surface which cooperates with an abutment counter-surface provided in said thrust and support element to prevent a free rotation of the lever in the opposite direction to said rotation thrust direction;

said thrust and support element and said second lever end define said guide channel which allows the passage of at least the coupling end when the cable body is elastically bent;

said guide channel allowing the coupling end to rotate about said second lever end and engage with said hooking seat upon the elastic return of the cable body in a cable body position substantially straight, preventing the rotation of the lever in the opposite direction to said rotation thrust direction when the coupling end rotates about said second lever end, wherein the lever abutment surface and the abutment counter-surface are parallel to a primary direction of the traction cable, and/or wherein the lever abutment surface and the abutment counter-surface are perpendicular to a tangential spring connected to the first and second jaws to recall them away from a inner cylindrical surface of the bell upon the ending of the braking action.

19. A brake comprising an assembly comprising:
a thrust and support element comprising a first thrust end of thrust and support element adapted to cooperate with a first jaw of a brake; said thrust and support element comprising a second thrust and support element end;

a lever rotatably supported to said thrust and support element for rotating at least along a rotation thrust direction;

said lever comprising a first lever end adapted to cooperate with a second jaw of the brake;

said lever comprising a second lever end, wherein said second lever end comprises a hooking seat; and wherein said hooking seat is adapted to firmly receive a connecting portion of a coupling end of a traction cable, said traction cable having a cable body capable of an elastic flexural deformation that allows it to return to the straight position when the bending stress is removed;

said lever being adapted to rotate only when subjected to the traction action of the traction cable, for acting with the first lever end against said second jaw of brake;

wherein said lever comprises a lever abutment surface which cooperates with an abutment counter-surface provided in said thrust and support element to prevent a free rotation of the lever in the opposite direction to said rotation thrust direction;

said thrust and support element and said second lever end define said guide channel which allows the passage of at least the coupling end when the cable body is elastically bent;

said guide channel allowing the coupling end to rotate about said second lever end and engage with said hooking seat upon the elastic return of the cable body in a cable body position substantially straight, preventing the rotation of the lever in the opposite direction to said rotation thrust direction when the coupling end rotates about said second lever end, wherein the lever abutment surface and the abutment counter-surface are parallel to a primary direction of the traction cable, and/or wherein the lever abutment surface and the abutment counter-surface are perpendicular to a tangential spring connected to the first and second jaws to recall them away from a inner cylindrical surface of the bell upon the ending of the braking action.

* * * * *